United States Patent
Aoki et al.

(10) Patent No.: US 6,250,764 B1
(45) Date of Patent: Jun. 26, 2001

(54) POLARIZATION BEAM SPLITTER, POLARIZATION CONVERTER, AND PROJECTOR

(75) Inventors: Kazuo Aoki, Chino; Yukihiro Endo, Nagano-ken, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/253,519

(22) Filed: Feb. 19, 1999

(30) Foreign Application Priority Data

Feb. 25, 1998 (JP) .................................................. 10-062168

(51) Int. Cl.[7] .......................... G03B 21/00; G03B 21/26; G03B 21/28; G02B 1/10
(52) U.S. Cl. ................................. 353/31; 353/32; 353/34; 353/81; 359/584
(58) Field of Search ................................. 353/31, 32, 34, 353/81; 359/584

(56) References Cited

U.S. PATENT DOCUMENTS

| | | | | |
|---|---|---|---|---|
| 4,380,372 | * | 4/1983 | Taguchi | 350/346 |
| 4,536,063 | * | 8/1985 | Southwell | 350/395 |
| 4,803,402 | * | 2/1989 | Raber et al. | 313/509 |
| 4,991,937 | * | 2/1991 | Urino | 350/385 |
| 5,751,474 | * | 5/1998 | Hohenegger et al. | 359/584 |
| 5,795,047 | * | 8/1998 | Sannohe et al. | 353/81 |
| 5,865,521 | * | 2/1999 | Hashizume et al. | 353/31 |

* cited by examiner

*Primary Examiner*—Russell Adams
*Assistant Examiner*—Khaled Brown
(74) *Attorney, Agent, or Firm*—Oliff & Berridge, PLC

(57) ABSTRACT

A technique for improving properties of polarizing beam splitters and polarizing conversion elements, and a projection display apparatus having high light utilization efficiency using such polarizing beam splitters are provided. A polarizing beam splitter in accordance with the present invention includes a light transmissive substrate having a refractive index ranging from approximately 1.48 to 1.58, and a polarization separating film formed on the light transmissive substrate. The polarization separating film includes a multilayered structural section formed by alternately arranging $MgF_2$ layers and MgO layers. The polarization separating film in accordance with the present invention can improve the transmission property and the reflection property with respect to two types of polarized light. Also, by using the polarization separating film for a polarizing conversion element or a projection display apparatus, it is possible to provide a polarizing conversion element or a projection display apparatus having high light utilization efficiency.

21 Claims, 12 Drawing Sheets

DESIGN WAVELENGTH λ : 600nm
L LAYER : MgF2(n = 1.38)
H LAYER : MgO(n = 1.73)

| LAYER | $D (= n \cdot d \cdot 4 / \lambda)$ |
|---|---|
| L 1 | 0.722 |
| H 2 | 0.917 |
| L 3 | 1.089 |
| H 4 | 0.714 |
| L 5 | 0.939 |
| H 6 | 0.914 |
| L 7 | 1.137 |
| H 8 | 0.906 |
| L 9 | 1.125 |
| H 10 | 0.953 |
| L 11 | 1.168 |
| H 12 | 0.925 |
| L 13 | 1.014 |
| H 14 | 0.726 |
| L 15 | 0.973 |
| H 16 | 0.965 |
| L 17 | 1.199 |
| H 18 | 0.971 |
| L 19 | 1.168 |
| H 20 | 1.001 |
| L 21 | 1.323 |
| H 22 | 1.217 |
| L 23 | 1.44 |
| H 24 | 1.091 |

| | * |
|---|---|
| L 25 | 1.275 |
| H 26 | 1.029 |
| L 27 | 1.328 |
| H 28 | 1.201 |
| L 29 | 1.398 |
| H 30 | 1.133 |
| L 31 | 1.394 |
| H 32 | 1.219 |
| L 33 | 1.56 |
| H 34 | 1.223 |
| L 35 | 1.542 |
| H 36 | 1.756 |
| L 37 | 1.79 |
| H 38 | 1.529 |
| L 39 | 1.564 |
| H 40 | 1.191 |
| L 41 | 1.728 |
| H 42 | 1.352 |
| L 43 | 1.792 |
| H 44 | 1.524 |
| L 45 | 1.617 |
| H 46 | 1.561 |
| L 47 | 1.7 |
| H 48 | 1.696 |
| L 49 | 1.734 |
| COATING LAYER | 3 |

FIG. 3

DESIGN WAVELENGTH λ : 600nm
L LAYER : MgF2(n = 1.38)
H LAYER : MgO(n = 1.73)

| LAYER | D (=n·d·4/λ) |
|---|---|
| L 1 | 0.722 |
| H 2 | 0.917 |
| L 3 | 1.089 |
| H 4 | 0.714 |
| L 5 | 0.939 |
| H 6 | 0.914 |
| L 7 | 1.137 |
| H 8 | 0.906 |
| L 9 | 1.125 |
| H 10 | 0.953 |
| L 11 | 1.168 |
| H 12 | 0.925 |
| L 13 | 1.014 |
| H 14 | 0.726 |
| L 15 | 0.973 |
| H 16 | 0.965 |
| L 17 | 1.199 |
| H 18 | 0.971 |
| L 19 | 1.168 |
| H 20 | 1.001 |
| L 21 | 1.323 |
| H 22 | 1.217 |
| L 23 | 1.44 |
| H 24 | 1.091 |
| * | |

| | * |
|---|---|
| L 25 | 1.275 |
| H 26 | 1.029 |
| L 27 | 1.328 |
| H 28 | 1.201 |
| L 29 | 1.398 |
| H 30 | 1.133 |
| L 31 | 1.394 |
| H 32 | 1.219 |
| L 33 | 1.56 |
| H 34 | 1.223 |
| L 35 | 1.542 |
| H 36 | 1.756 |
| L 37 | 1.79 |
| H 38 | 1.529 |
| L 39 | 1.564 |
| H 40 | 1.191 |
| L 41 | 1.728 |
| H 42 | 1.352 |
| L 43 | 1.792 |
| H 44 | 1.524 |
| L 45 | 1.617 |
| H 46 | 1.561 |
| L 47 | 1.7 |
| H 48 | 1.696 |
| L 49 | 1.734 |
| COATING LAYER | 3 |

FIG. 5(A)

DESIGN WAVELENGTH λ : 600nm
L LAYER : SiO2(n = 1.44)
H LAYER : TiO2(n = 2.266)

| LAYER | | D (=n·d·4/λ) |
|---|---|---|
| H | 1 | 2.3 |
| L | 2 | 1.136 |
| H | 3 | 0.806 |
| L | 4 | 0.957 |
| H | 5 | 0.649 |
| L | 6 | 1.041 |
| H | 7 | 0.8446 |
| L | 8 | 1.19 |
| H | 9 | 0.816 |
| L | 10 | 0.933 |
| H | 11 | 0.676 |
| L | 12 | 1.103 |
| H | 13 | 0.882 |
| L | 14 | 1.271 |
| H | 15 | 1.095 |
| L | 16 | 1.605 |
| H | 17 | 1.045 |
| L | 18 | 1.35 |
| H | 19 | 1.216 |
| L | 20 | 1.561 |
| H | 21 | 1.054 |
| L | 22 | 1.592 |
| H | 23 | 1.227 |
| L | 24 | 1.471 |
| H | 25 | 1.186 |
| L | 26 | 1.698 |
| H | 27 | 1.193 |
| L | 28 | 1 |

FIG. 5(B)

DESIGN WAVELENGTH λ : 680nm
L LAYER : SiO2(n = 1.44)
H LAYER : Ta2O5(n = 2.18)

| LAYER | | D (=n·d/λ) |
|---|---|---|
| H | 1 | 0.18729 |
| L | 2 | 0.22849 |
| H | 3 | 0.17011 |
| L | 4 | 0.23361 |
| H | 5 | 0.19417 |
| L | 6 | 0.25724 |
| H | 7 | 0.20001 |
| L | 8 | 0.2494 |
| H | 9 | 0.18429 |
| L | 10 | 0.23645 |
| H | 11 | 0.18896 |
| L | 12 | 0.26177 |
| H | 13 | 0.20696 |
| L | 14 | 0.28148 |
| H | 15 | 0.24956 |
| L | 16 | 0.40664 |
| H | 17 | 0.23176 |
| L | 18 | 0.29715 |
| H | 19 | 0.31641 |
| L | 20 | 0.33827 |
| H | 21 | 0.23622 |
| L | 22 | 0.38271 |
| H | 23 | 0.29301 |
| L | 24 | 0.30743 |
| H | 25 | 0.31112 |
| L | 26 | 0.37505 |
| H | 27 | 0.78342 |
| L | 28 | 1.04177 |

FIG. 5(C)

POLARIZATION BEAM SPLITTER, POLARIZATION CONVERTER, AND PROJECTOR

BACKGROUND OF THE INVENTION

1. Field of Invention

The present invention relates to a polarizing beam splitter for splitting incident light into two types of polarized light, and a polarizing conversion element and a projection display apparatus which are provided with the polarizing beam splitter.

2. Description of Related Art

Generally, a projection display apparatus includes an element referred to as "a light valve" for modulating light in response to picture signals. In many cases, a transmissive liquid crystal panel or a reflective liquid crystal panel is used as a light valve, in which only one type of linear polarized light is employed. In such a projection display apparatus that employs one type of linear polarized light, a polarizing conversion element is included for converting unpolarized incident light emitted from a light source into one type of linear polarized light (e.g., s-polarized light).

SUMMARY OF THE INVENTION

In order to increase luminance of images displayed on a projection screen, it is desirable that unpolarized light entered into a polarizing conversion element be efficiently converted into one type of linear polarized light. That is, the transmission and reflection properties of a polarization separating film and the reflection property of a reflecting film, which are provided on the polarizing conversion element, are desirably enhanced as much as possible. Also, with respect to polarizing beam splitters or polarizing conversion elements used for other devices than projection display apparatuses, improvement in the transmission property and the reflection property have been desired.

The present invention overcomes the problems noted above with respect to the related art. It is an object of this invention to provide a technique for improving properties of polarizing beam splitters and polarizing conversion elements. It is another object of this invention to provide projection display apparatuses having high light utilization efficiency using such polarizing beam splitters.

In order to solve at least one problem described above, a first element of the present invention is a polarizing beam splitter for splitting incident light into two types of polarized light, the polarizing beam splitter including a light transmissive substrate having a refractive index ranging from approximately 1.48 to 1.58, and a polarization separating film formed on the light transmissive substrate. The polarization separating film is provided with a multilayered structural section including $MgF_2$ layers and MgO layers alternately arranged.

This polarizing beam splitter can improve the transmission property with respect to one polarized light and the reflection property with respect to other polarized light by using the multilayered structural section composed of $MgF_2$ and MgO.

In the polarizing beam splitter described above, the polarization separating film preferably includes a coating layer composed of $SiO_2$ on the multilayered structural section.

Thereby, when the polarization separating film formed on the substrate is adhered to other member by an optical adhesive, adhesion between the polarization separating film and the other member can be increased.

A second element of the present invention is a polarizing beam splitter, for splitting incident light into two types of polarized light, the polarizing beam splitter including a light transmissive substrate having a refractive index ranging from approximately 1.48 to 1.58, and a polarization separating film formed on the light transmissive substrate. The polarization separating film is provided with a multilayered structural section including a plurality of layers, and a coating layer composed of $SiO_2$ formed on the multilayered structural section.

Since the polarizing beam splitter is provided with the coating layer composed of $SiO_2$ formed on the multilayered structural section, when the polarization separating film formed on the substrate is adhered to another member by an optical adhesive, adhesion between the polarization separating film and the other member can be increased.

A third element of the present invention is a polarizing conversion element for converting incident light into one type of polarized light, the polarizing conversion element including a polarizing beam splitter for splitting incident light into a first type and a second type of polarized light, and a selective phase plate for converting the first type of polarized light into the second type of polarized light. The polarizing beam splitter includes a plurality of light transmissive substrates placed along a given direction, and a plurality of polarization separating films and a plurality of reflecting films alternately placed between the plurality of light transmissive substrates. Each of the light transmissive substrates has a refractive index ranging from approximately 1.48 to 1.58, and each of the polarization separating films is provided with a multilayered structural section including $MgF_2$ layers and MgO layers alternately arranged.

Since the polarizing conversion element employs the multilayered structural section composed of $MgF_2$ and MgO as the polarization separating film, incident light can be efficiently converted into one type of polarized light.

A fourth element of the present invention is a polarizing conversion element for converting incident light into one type of polarized light, the polarizing conversion element including a polarizing beam splitter for splitting incident light into a first type and a second type of polarized light, and a selective phase plate for converting the first type of polarized light into the second type of polarized light. The polarizing beam splitter includes a plurality of light transmissive substrates placed along a given direction, and a plurality of polarization separating films and a plurality of reflecting films alternately placed between the plurality of light transmissive substrates. Each of the light transmissive substrates has a refractive index ranging from approximately 1.48 to 1.58. Each of the polarization separating films is provided with a multilayered structural section including a plurality of layers, and a coating layer composed of $SiO_2$ formed on the multilayered structural section.

Since the polarizing beam splitter in the polarizing conversion element is provided with the coating layer composed of $SiO_2$ formed on the multilayered structural section, when the polarization separating film formed on the substrate is adhered to another member by an optical adhesive, adhesion between the polarization separating film and the other member can be increased.

In accordance with the third or fourth polarizing conversion element described above, the reflecting film may have the same structure as that of the polarization separating film.

This makes it possible to use both the polarization separating film and the reflecting film as either film because of their same structure, and thereby, the fabrication of the films is facilitated.

In accordance with the polarizing conversion element described above, the reflecting film may include a multilayered structural section having a first layer and a second layer alternately arranged, the first layer having a lower refractive index and the second layer having a higher refractive index in comparison with a refractive index of the light transmissive substrate. The first layer of the reflecting film may be composed of $SiO_2$, and the second layer may be composed of $Ta_2O$, or $TiO_2$.

As described above, by using the multilayered structural section composed of $SiO_2$ and $Ta_2O_5$ or a reflection film including the multilayered structural section composed of $SiO_2$ and $TiO_2$ as the reflecting film, a higher reflectance can be obtained with a smaller number of layers in comparison with a case in which the polarization separating film has the same structure as that of the reflecting film as described above.

In the polarizing conversion element described above, the second layer is preferably a $TiO_2$ layer formed by placing evaporated $TiO_2$ in a plasma atmosphere.

This allows a $TiO_2$ layer to be dense although it is generally difficult to form a dense layer with respect to $TiO_2$, and thus, a polarizing beam splitter having a high-quality reflecting film can be obtained.

A first device of the present invention is a projection display apparatus for displaying images by projecting light, the projection display apparatus including a polarized light illumination apparatus for generating substantially one type of polarized light, a modulation device for modulating the light emitted from the polarized light illumination apparatus in response to given picture signals, and a projection optical device for projecting the light modulated by the modulation device. The polarized light illumination apparatus includes a light source, and a polarizing conversion element for converting the light emitted from the light source into substantially one type of polarized light. The polarizing conversion element includes a polarizing beam splitter for splitting incident light into a first type and a second type of polarized light, and a selective phase plate for converting the first type of polarized light into the second type of polarized light. The polarizing beam splitter includes a plurality of light transmissive substrates placed along a given direction, and a plurality of polarization separating films and a plurality of reflecting films alternately placed between the plurality of light transmissive substrates. Each of the plurality of light transmissive substrates has a refractive index ranging from approximately 1.48 to 1.58. Each of the plurality of polarization separating films is provided with a multilayered structural section including $MgF_2$ layers and $MgO$ layers alternately arranged.

Since the polarizing beam splitter in the projection display apparatus includes the polarization separating films of the first element described above, the light from the light source can be converted into one desired type of polarized light with high efficiency to be transmitted to the modulation device. Therefore, luminance of images projected on a screen by the projection display apparatus can be enhanced.

A second device of the present invention is a projection display apparatus for displaying images by projecting light, the projection display apparatus including a polarized light illumination apparatus for generating substantially one type of polarized light, a modulation device for modulating the light emitted from the polarized light illumination apparatus in response to given picture signals, and a projection optical device for projecting the light modulated by the modulation device. The polarized light illumination apparatus includes a light source, and a polarizing conversion element for converting the light emitted from the light source into substantially one type of polarized light. The polarizing conversion element includes a polarizing beam splitter for splitting incident light into a first type and a second type of polarized light, and a selective phase plate for converting the first type of polarized light into the second type of polarized light. The polarizing beam splitter includes a plurality of light transmissive substrates placed along a given direction, and a plurality of polarization separating films and a plurality of reflecting films alternately placed between the plurality of light transmissive substrates. Each of the plurality of light transmissive substrates has a refractive index ranging from approximately 1.48 to 1.58. Each of the plurality of polarization separating films is provided with a multilayered structural section including a plurality of layers, and a coating layer composed of $SiO_2$ formed on the multilayered structural section.

Since the polarizing beam splitter in the projection display apparatus includes the polarization separating films of the second element described above, when the polarization separating film formed on the substrate is adhered to another member by an optical adhesive, adhesion between the polarization separating film and the other member can be increased.

BRIEF DESCRIPTION OF THE DRAWINGS

FIG. 3 is a table showing a thickness of each layer in the polarization separating film 20 illustrated in FIG. 2.;

FIGS. 5(A)–(C) represent various examples of reflecting films 30;

DETAILED DESCRIPTION OF PREFERRED EMBODIMENTS

A. Structures of Polarization Beam Splitting

Film and Polarizing Conversion Element

Figure 1A:
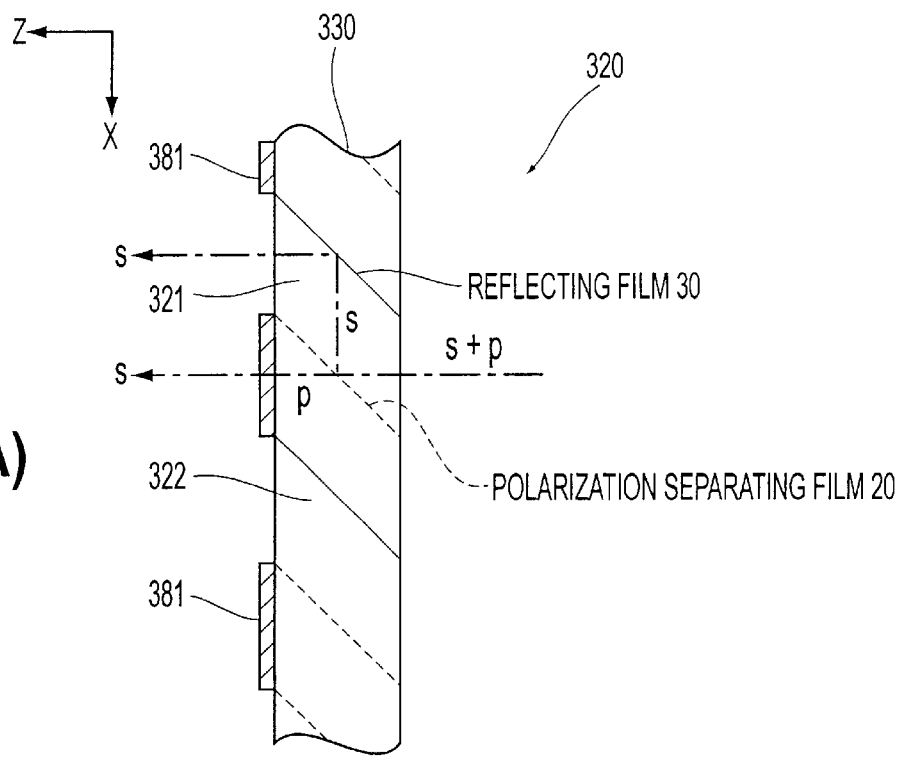
FIGS. 1(A)–(B) are schematic diagrams showing an example of a polarizing conversion element 320 in accordance with the present invention.
Figure 1B:
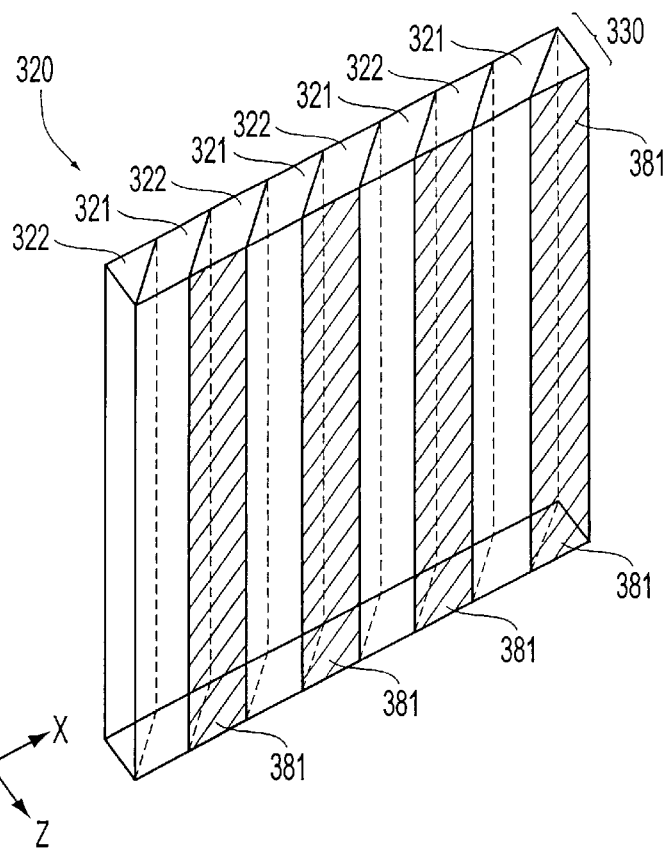

Embodiments of the present invention will be described based on examples. FIGS. 1(A)–(B) are schematic diagrams showing an example of a polarizing conversion element 320 in accordance with the present invention. FIG. 1(A) is a plan view of the polarizing conversion element 320, and FIG. 1(B) is a perspective view of the polarizing conversion element 320. The polarizing conversion element 320 includes a polarizing beam splitter 330 for splitting incident light into s-polarized light and p-polarized light, and a λ/2 phase plate 381 for converting the two types of linear polarized light split by the polarizing beam splitter 330 into one type of linear polarized light. The λ/2 phase plate 381 corresponds to a selective phase plate in accordance with the present invention.

The polarizing beam splitter 330 includes first and second light transmissive substrates (hereinafter referred to as substrates) 321 and 322 alternately laminated, each substrate being parallelogrammatic in cross section and having a columnar structure. A polarization separating film 20 and a reflecting film 30 are alternately provided between the substrates 321 and substrates 322.

When light having random polarization beam directions including a s-polarized light component and a p-polarized light component enters into the polarization separating film 20 in the polarizing conversion element 320 shown in FIG. 1(A), the incident light is first split into s-polarized light and p-polarized light by the polarization separating film 20. The s-polarized light is substantially perpendicularly reflected by the polarization separating film 20, and then is prependicularly reflected by the reflecting film 30 before being emitted. On the other hand, the p-polarized light passes through the polarization separating film 20 as is. The λ/2 phase plate 381 is placed on the emitting plane of the p-polarized light that has passed through the polarization separating film 20. The p-polarized light is converted into s-polarized light by the λ/2 phase plate 381 before being emitted. Therefore, the light that has passed through the polarizing conversion element 320 exits mostly as s-polarized light. Also, if p-polarized light is required as the light emitted from the polarizing conversion element 320, the λ/2 phase plate 381 may be placed on the emitting plane of the s-polarized light that has been reflected by the reflecting film 30.

Figure 2:
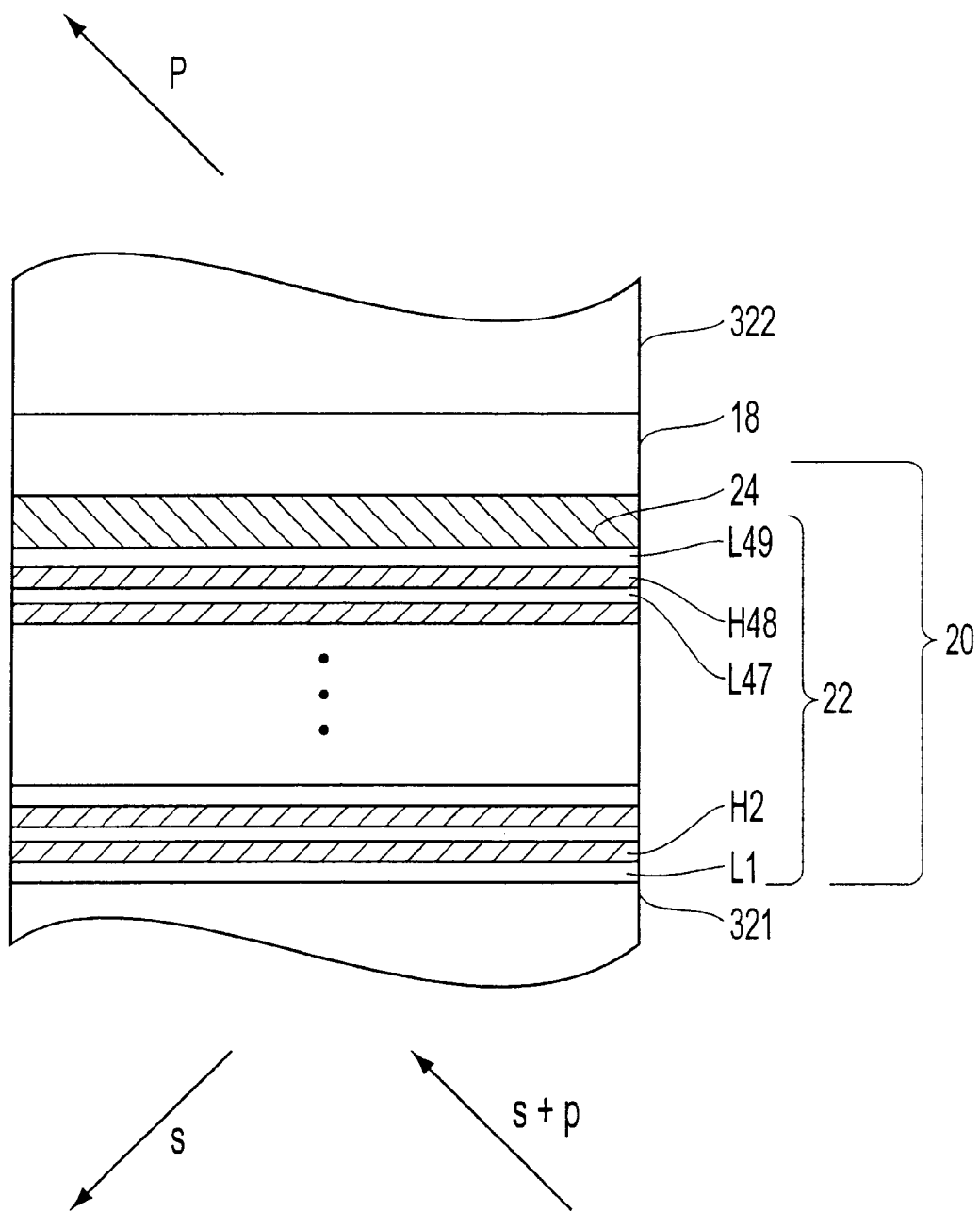
FIG. 2 is an enlarged sectional view of a portion of a polarization separating film 20.

FIG. 2 is an enlarged sectional view of a portion of the polarization separating film 20. The polarization separating film 20 is a dielectric multilayered film arranged on the light transmissive substrate 321, and includes a multilayered structural section 22, in which 49 layers composed of two materials are alternately arranged, and a coating layer 24 formed on the multilayered structural section 22. The polarization separating film 20 is formed on the surface of the substrate 321 by placing each layer sequentially. The substrate 321 arranged with the polarization separating film 20 is bonded onto the substrate 322 with an optical adhesive 18 therebetween. The coating layer 24 enhances adhesion between the polarization separating film 20 and the substrate 322.

The multilayered structural section 22 is formed by placing layers that have a relatively low refractive index in relation to the substrate 321 (hereinafter referred to as L layers) and layers that have a relatively high refractive index (hereinafter referred to as H layers) on the substrate 321 having a refractive index of approximately 1.5. In the example illustrated in FIG. 2, a total of 49 layers are formed consisting of L1, H2, L3, H4, . . . L47, H48, L49. The coating layer 24 has a refractive index that is between that of the H layer and that of the L layer. As materials for substrates 321 and 322, various materials having a refractive index ranging from approximately 1.48 to 1.58 may be used, for example, glassboard with a refractive index of approximately 1.52 or optical glass such as BK7-S. As a material for the L layer in the polarization separating film 20, $MgF_2$ having a refractive index of approximately 1.38 is used, and as a material for the H layer, MgO having a refractive index of approximately 1.73 is used. Also, as a material for the coating layer 24, $SiO_2$ having a refractive index of approximately 1.44 is used. It has been known that the refractive index of each layer varies with absorption of moisture from the air or the like. In this specification, the "refractive index" is defined as the refractive index that is obtained when the polarization separating film 20 is exposed to air for long periods.

FIG. 3 is a table showing the thickness of each layer in the polarization separating film 20 illustrated in FIG. 2. In this structure, the design wavelength λ is set at 600 nm. A design wavelength λ is an initially set value when a film is designed, and the thickness of each layer is determined so that desired transmission and reflection properties can be obtained at this design wavelength. As a design wavelength λ, the wavelength of a major light component that is used in an optical element is generally selected. The polarizing conversion element 320 of this example is used for converting polarization beam with respect to three color beams of R, G, and B, and in this example a wavelength near the red color (600 nm) is selected as a design wavelength. In FIG. 3, the value D in the right column indicates a value calculated by dividing an optical thickness (an actual thickness d multiplied by a refractive index n of the material) of each layer by a quarter of the design wavelength λ. Accordingly, the actual thickness d is a value calculated by multiplying the value D by λ/4 and dividing by n. With respect to the refractive index n, a refractive index of the L layer is used for the L layer and a refractive index of the H layer is used for the H layer. As shown in FIG. 3, although the optical thickness of each layer in the multilayered structural section 22 corresponds to a value of approximately λ/4, each layer has a different value D. Also, the coating layer 24 has an optical thickness of ¾λ.

Figure 4:
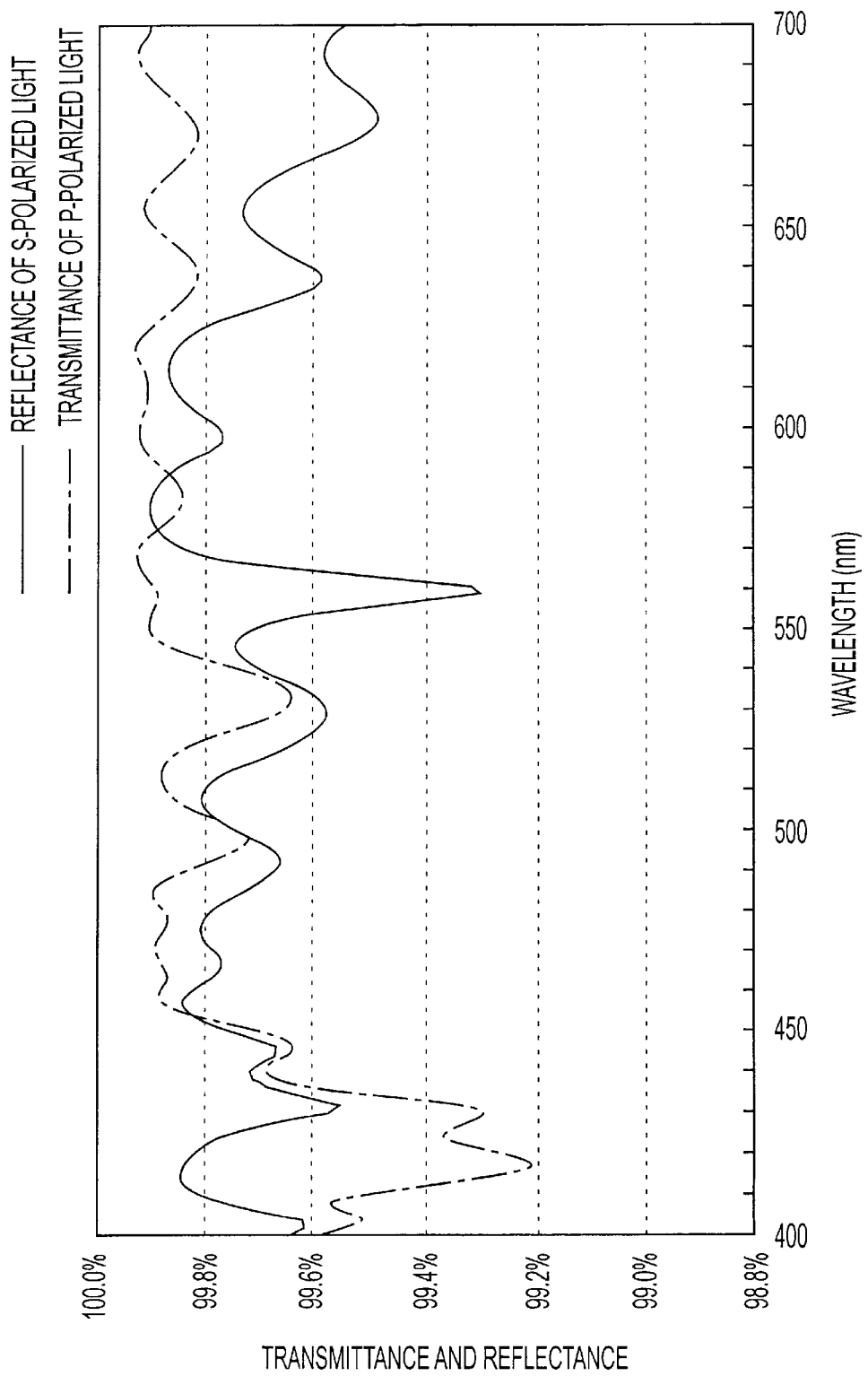
FIG. 4 is a graph which shows results of a simulation of optical properties with respect to the polarization separating film 20 having the structure shown in FIG. 3.

FIG. 4 is a graph which shows the results of a simulation of optical properties with respect to the polarization separating film 20 having the structure shown in FIG. 3. At a wavelength range from 400 to 700 nm, the refractive index of each layer varies by approximately 0.1. The results of the simulation shown in FIG. 4 have been obtained by solving a film characteristic matrix in consideration of the wavelength properties of the refractive index of each layer.

As shown in FIG. 4, with respect to the polarization separating film 20, in the visible range from 400 to 700 nm, the transmittance of p-polarized light is 99.2% or more, and the reflectance of s-polarized light is 99.3% or more. Therefore, by using the polarization separating film 20, the polarizing beam splitter 330 that transmits p-polarized light and reflects s-polarized light with high efficiency in the visible range can be fabricated. The coating layer 24, which is placed in order to enhance adhesion between the multilayered structural section 22 and the substrate 322, does not greatly affect the optical properties of the polarization separating film 20. That is, even without the coating layer 24, a similar result as that of the simulation shown in FIG. 4 can be obtained, and thus the coating layer 24 may be omitted. Also, although the result of the simulation shown in FIG. 4 was obtained when light was made to enter from the side of the L1 layer, a similar result will be obtained when light is made to enter from the side of the coating layer 24.

FIGS. 5(A)–(B) represent various examples of the reflecting films 30. The reflecting film 30 is a dielectric multilayered film placed on the substrate 321 in a manner similar to that of the polarization separating film 20 shown in FIG. 2, in which two types of materials are alternately arranged.

In the reflecting film 30 shown in FIG. 5(A), $MgF_2$ is used as a material for the L layer and MgO is used as a material for the H layer to form a multilayered film having the same structure as that of the polarization separating film 20 shown in FIG. 3. That is, a total of 49 layers are placed on the substrate 321 in the order of L1, H2, L3, H4, . . . L47, H48, L49, and the coating layer 24 is placed on as the 50th layer.

As described above, in the reflecting film 30, the coating layer of the 50th layer is also not necessary.

When the reflecting film having the structure shown in FIG. 5(A) is used, the reflection property of the s-polarized light is the same as the reflection property of the s-polarized light shown in FIG. 4, and as described above, a reflectance of 99.3% or more can be obtained in the visible range from 400 to 700 nm. If the multilayered film that has a high transmittance of p-polarized light and a high reflectance of s-polarized light is used, the same structured multilayered film may be used both for the polarization separating film and for the reflecting film.

In the structure shown in FIG. 5(B), $SiO_2$ having a refractive index of approximately 1.44 is used as a material for the L layer, and $TiO_2$ having a refractive index of approximately 2.266 is used as a material for the H layer. In the reflecting film 30 having the structure shown in FIG. 5(B), 28 layers are placed on the substrate 321 in the order of H1, L2, H3, L4, . . . H27, L28. The reflecting film 30 in accordance with FIG. 5(B) has a smaller number of layers in comparison with the reflecting film 30 in accordance with FIG. 5(A), resulting in an easier fabrication.

Figure 6:
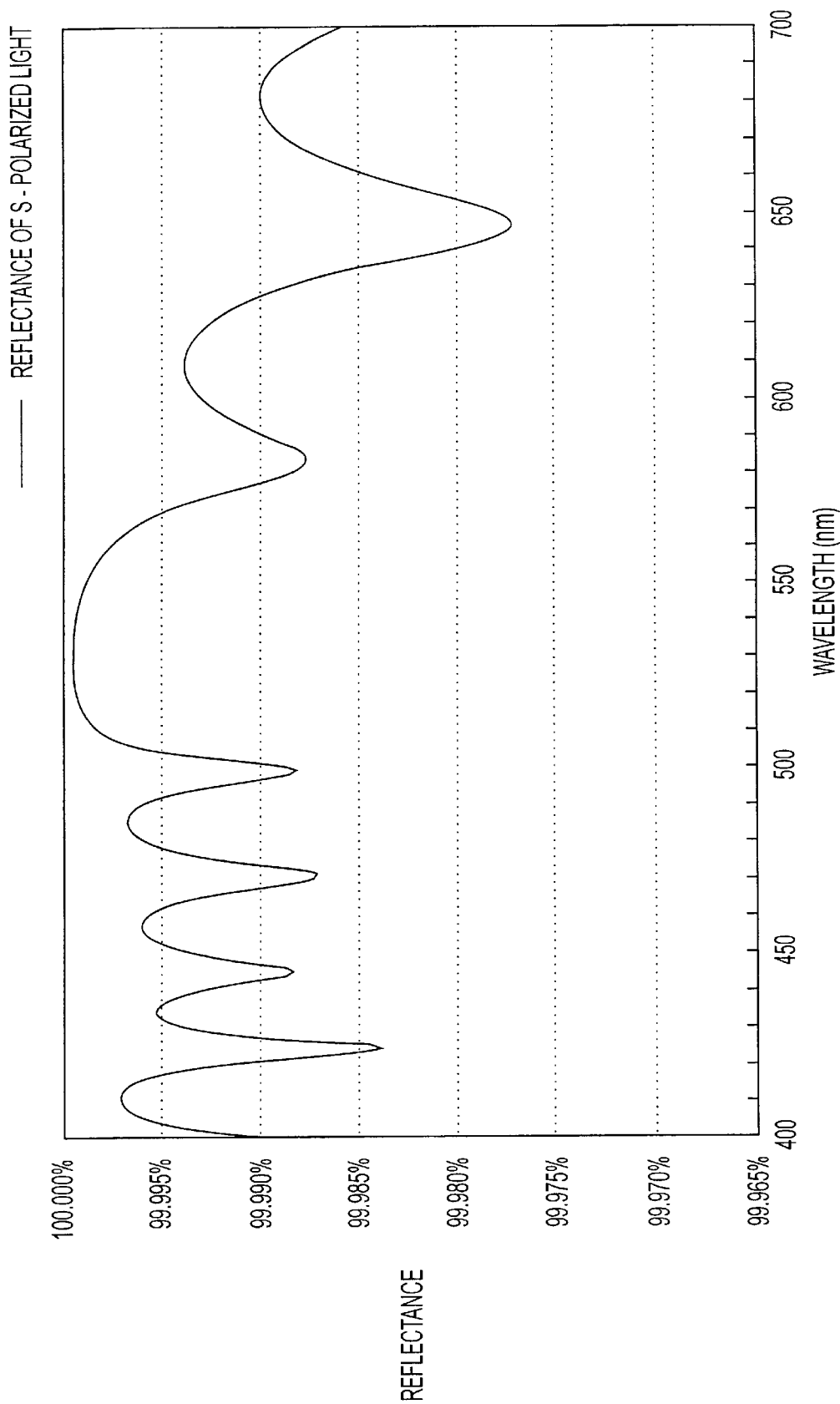
FIG. 6 is a graph which shows results of a simulation of the reflection property of s-polarized light when the reflecting film shown in FIG. 5(B) is used.

FIG. 6 is a graph which shows the results of a simulation of the reflection property of s-polarized light when the reflecting film having the structure shown in FIG. 5(B) is used. As shown in FIG. 6, when the reflecting film 30 having the structure shown in FIG. 5(B) is used, a high reflectance of 99.975% or more can be obtained in the visible range from 400 to 700 nm. Also, in this reflecting film 30, the same result of the simulation can be obtained either when light is made to enter from the side of the H1 layer or when light is made to enter from the side of the L28 layer.

In the structure shown in FIG. 5(C), $SiO_2$ having a refractive index of approximately 1.44 is used as a material for the L layer, and $Ta_2O_5$ having a refractive index of approximately 2.18 is used as a material for the H layer. In the reflecting film 30 having the structure shown in FIG. 5(C), 28 layers are placed on the substrate 321 in the order of H1, L2, H3, L4, . . . H27, L28. This reflecting film 30 also has a smaller number of layers in comparison with the reflecting film 30 in accordance with FIG. 5(A), resulting in an easier fabrication. The structure of the reflecting film shown in FIG. 5(C) is calculated when the design wavelength λ is set at 680 nm. The value D is calculated by dividing the optical thickness of each layer by the design wavelength λ (680 nm). Accordingly, the actual thickness d is the value calculated by multiplying the value D by λ and dividing by a refractive index n of each layer.

Figure 7:
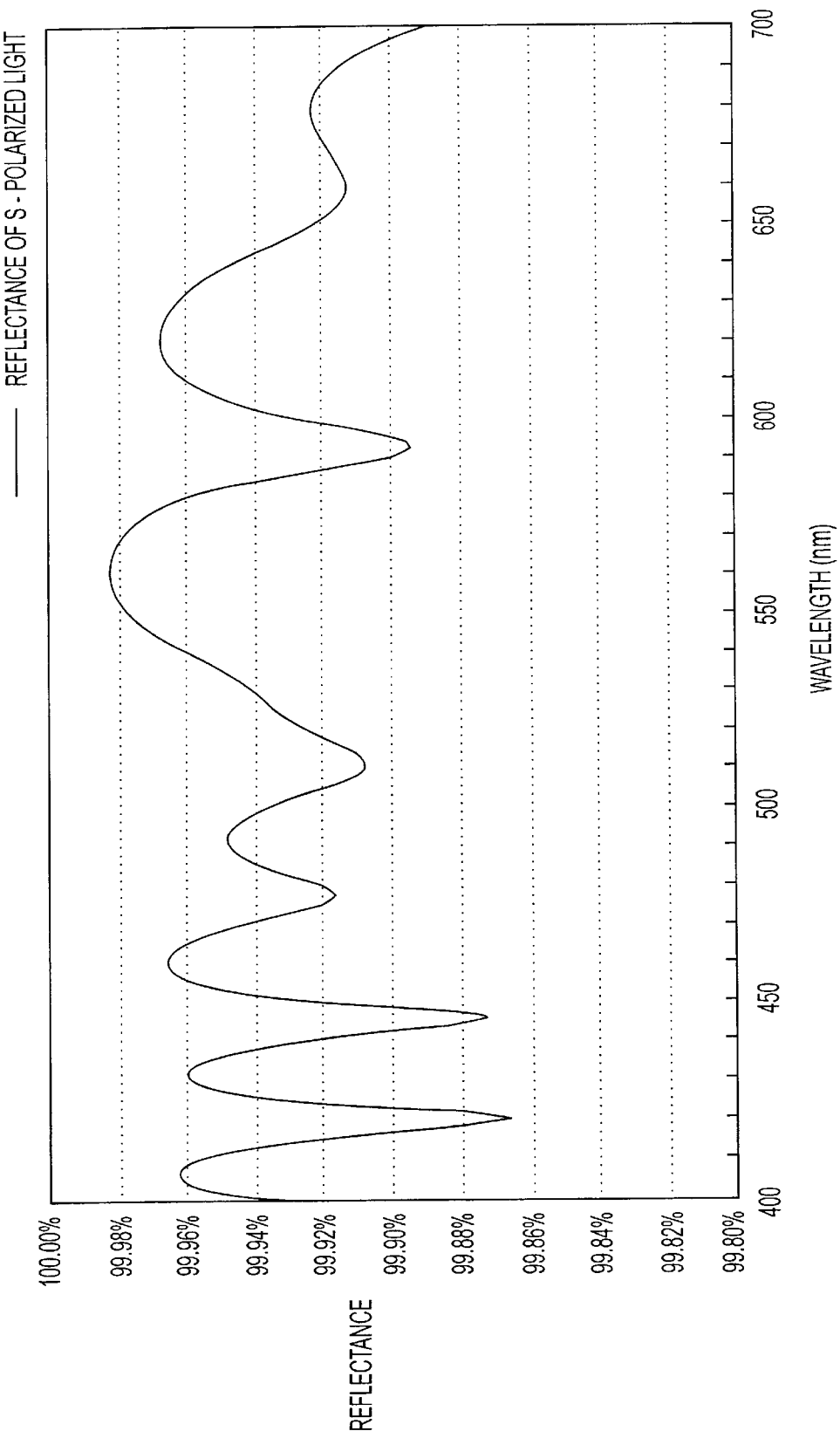
FIG. 7 is a graph which shows the result of a simulation of the reflection property of s-polarized light when the reflecting film shown in FIG. 5(C) is used.

FIG. 7 is a graph which shows the results of a simulation of the reflection property of s-polarized light when the reflecting film having the structure shown in FIG. 5(C) is used. As shown in FIG. 7, when the reflecting film having the structure shown in FIG. 5(C) is used, a high reflectance of 99.86% or more can be obtained in the visible range from 400 to 700 nm.

As shown in FIGS. 5(B) and 5(C), when the reflecting film 30 is designed for the purpose of enhancing the reflection property of s-polarized light, a high reflectance as shown in FIG. 6 or FIG. 7 can be achieved with a relatively smaller number of layers.

The polarizing beam splitter 330 (shown in FIGS. 1(A)–(B)) using the polarization separating film 20 and the reflecting film 30 as described above can highly efficiently split incident light into s-polarized light and p-polarized light for radiation. Also, the polarizing conversion element 320 (shown in FIGS. 1(A)–(B)) provided with the polarizing beam splitter 330 can highly efficiently convert incident light into one type of polarized light(s-polarized light or p-polarized light) for radiation.

The dielectric multilayered films as shown in FIG. 3 and FIGS. 5(A)–(C) are generally formed by a deposition apparatus using PVD (vacuum evaporation), plasma enhanced CVD, or the like. When a PVD system is used, $MgF_2$ layers and $SiO_2$ layers are placed at a degree of vacuum of approximately $2.6 \times 10^{-3}$ Pa ($2 \times 10^{-5}$ Torr). MgO layers are placed by evaporation while being fed with oxygen and at a degree of vacuum of approximately $3.99 \times 10^{-2}$ Pa ($3 \times 10^{-4}$ Torr). Also, the temperature of substrates is set at approximately 300° C. during deposition.

On the other hand, with respect to $TiO_2$ layers constituting the reflecting film 30 shown in FIG. 5(B), there may be a difficulty in forming dense layers by the deposition apparatus using PVD, plasma enhanced CVD, or the like. In accordance with the present invention, $TiO_2$ layers are placed by using an ion beam assisted deposition apparatus in which layers are placed by generating plasma in an ion beam assisted process which will be described below.

Figure 8:
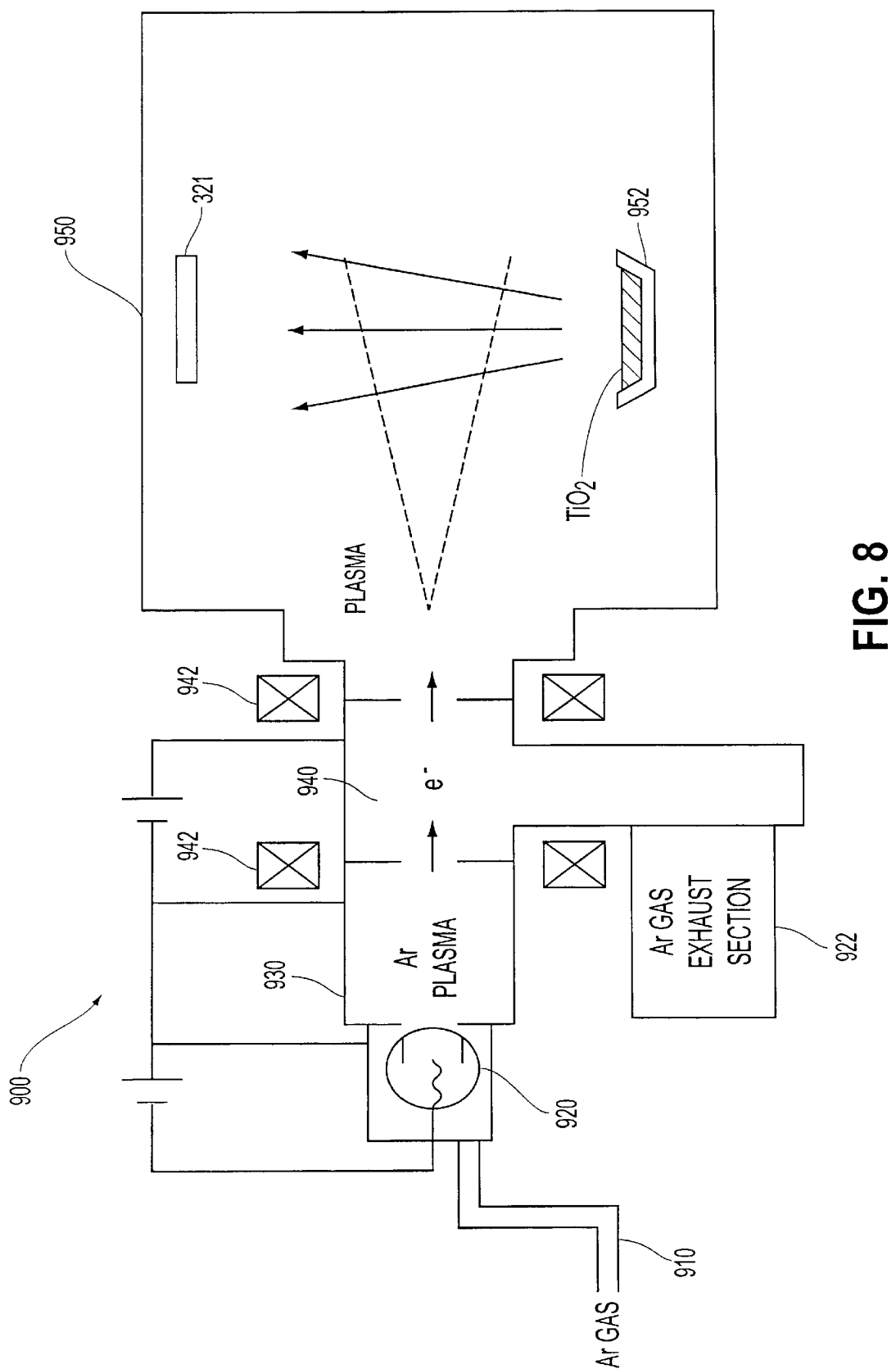
FIG. 8 is a schematic diagram showing an ion beam assisted deposition apparatus 900.

FIG. 8 is a schematic diagram showing an ion beam assisted deposition apparatus 900. The ion beam assisted deposition apparatus 900 includes an Ar gas feed opening 910, a filament 920, a plasma generation section 930, an electron beam generating section 940, accelerator coils 942, an Ar gas exhaust section 922, and a deposition treating section 950.

An Ar gas fed from the Ar gas feed opening 910 is transformed into an Ar plasma by thermoelectrons radiating from the filament 920 in the plasma generation section 930. In the electron beam generating section 940, accelerator coils 942 placed in the periphery of the electron beam generating section 940 extract electrons from the Ar plasma, and generate an electron beam by acceleration. The electron beam is led into the deposition treating section 950, and plasma is generated in the deposition treating section 950.

When a $TiO_2$ layer is formed on the substrate 321, the electron beam radiating from an electron gun (not shown in the drawing) in the deposition treating section 950 melts and evaporates $TiO_2$ contained in a container referred to as "hearth" 952. The evaporated $TiO_2$ passes through the plasma atmosphere generated in the deposition treating section 950 to reach the substrate 321 and is placed. The degree of vacuum at this stage is approximately $1.33 \times 10^{-2}$ Pa ($1 \times 10^{-4}$ Torr). Also, the deposition temperature of the substrate 321 is set at approximately 250° C.

When the ion beam assisted deposition is used, denser $TiO_2$ layers can be placed in comparison with the PVD or the plasma enhanced CVD. Moreover, the temperature of the substrate during deposition (approximately 250° C.) is lower than the temperature of the substrate (approximately 300° C.) in the case of the PVD or the plasma enhanced CVD. The ion beam assisted deposition can be applied to various layers such as $Ta_2O_5$ layers in addition to the $TiO_2$ layers described above in order to form dense layers.

B. Structure of Projection Display Apparatus

Figure 9:
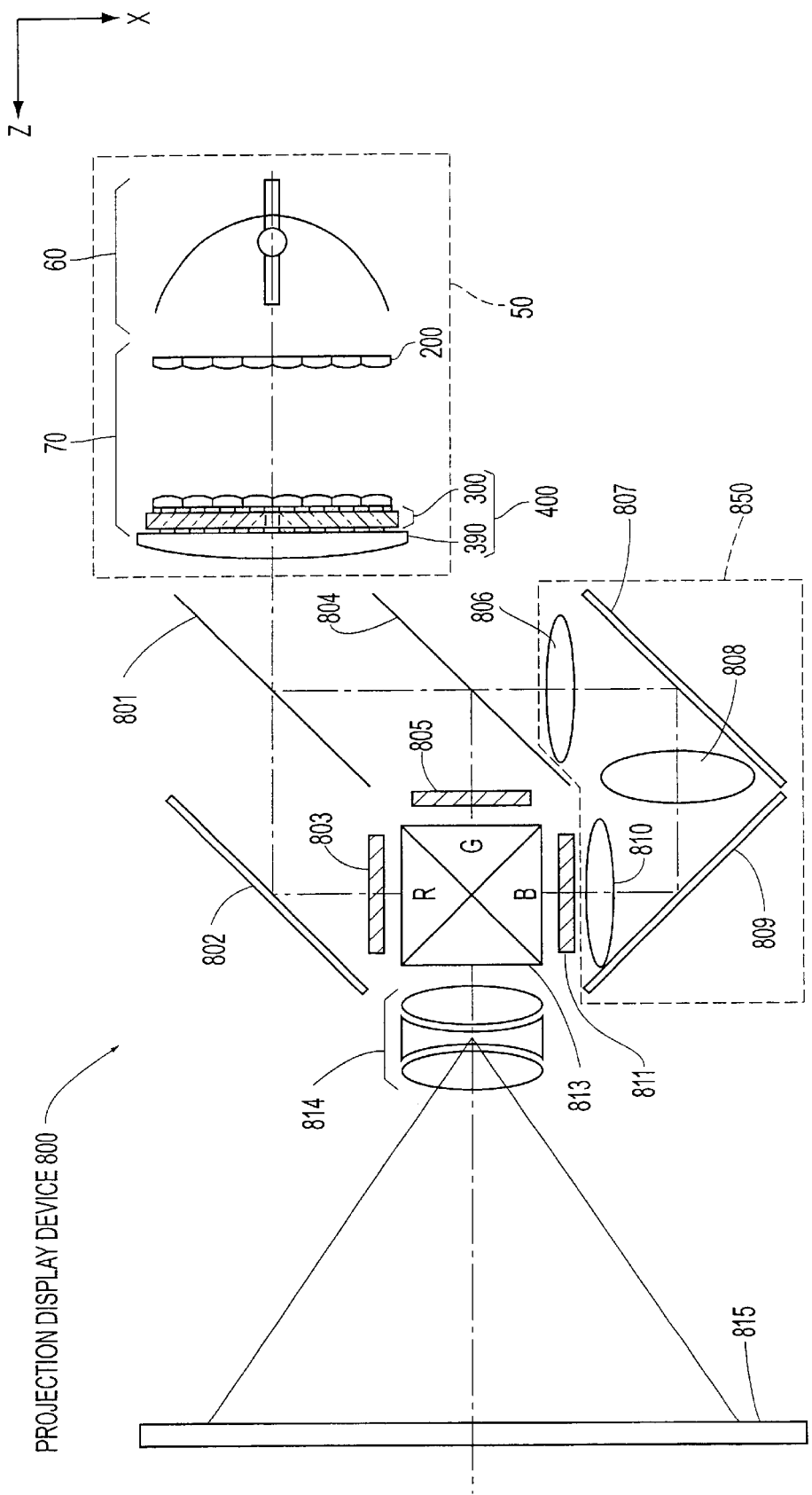
FIG. 9 is a schematic diagram of the key portion of a projection display apparatus 800 provided with the polarizing conversion element shown in FIGS. 1 (A)–(B)

FIG. 9 is a schematic diagram of the key portion of a projection display apparatus 800 provided with the polarizing conversion element shown in FIGS. 1(A)–(B). The projection display apparatus 800 includes a polarized light illumination apparatus 50, dichroic mirrors 801 and 804, reflecting mirrors 802, 807, and 809, relay lenses 806, 808, and 810, three liquid crystal light valves 803, 805, and 811, a cross-dichroic prism 813, and a projection lens 814.

Figure 10:
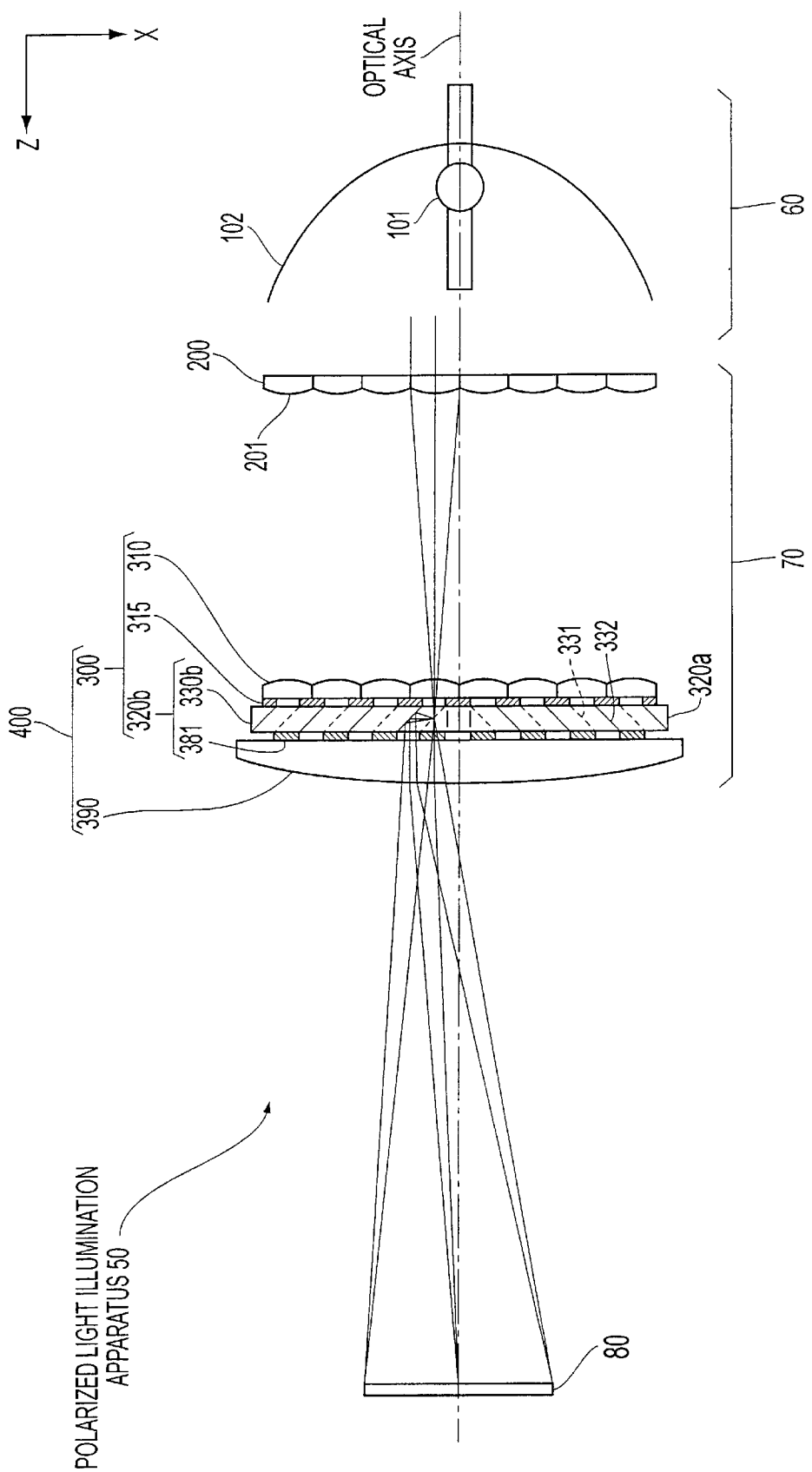
FIG. 10 is a schematic diagram of the key portion of the polarized light illumination apparatus 50 shown in FIG. 9.

FIG. 10 is a schematic diagram of the key portion of the polarized light illumination apparatus 50 shown in FIG. 9 viewed from an angle. The polarized light illumination apparatus 50 includes a light source 60 and a polarized light generation apparatus 70. The light source 60 radiates a beam having random polarization beam directions including an s-polarized light component and a p-polarized light component. The beam radiating from the light source 60 is converted into one type of linear polarized light having a substantially uniform polarization beam direction (s-polarized light in accordance with this example) for illuminating an illumination area 80. The illumination area 80 corresponds to the three liquid crystal light valves 803, 805, and 811 in the projection display apparatus shown in FIG. 9.

The light source 60 includes a light source lamp 101 and a paraboloidal reflector 102. Light emitted from the light source lamp 101 is reflected by the paraboloidal reflector 102 in one direction, and enters into the polarized light generation apparatus 70 as a substantially parallel beam.

Figure 11:
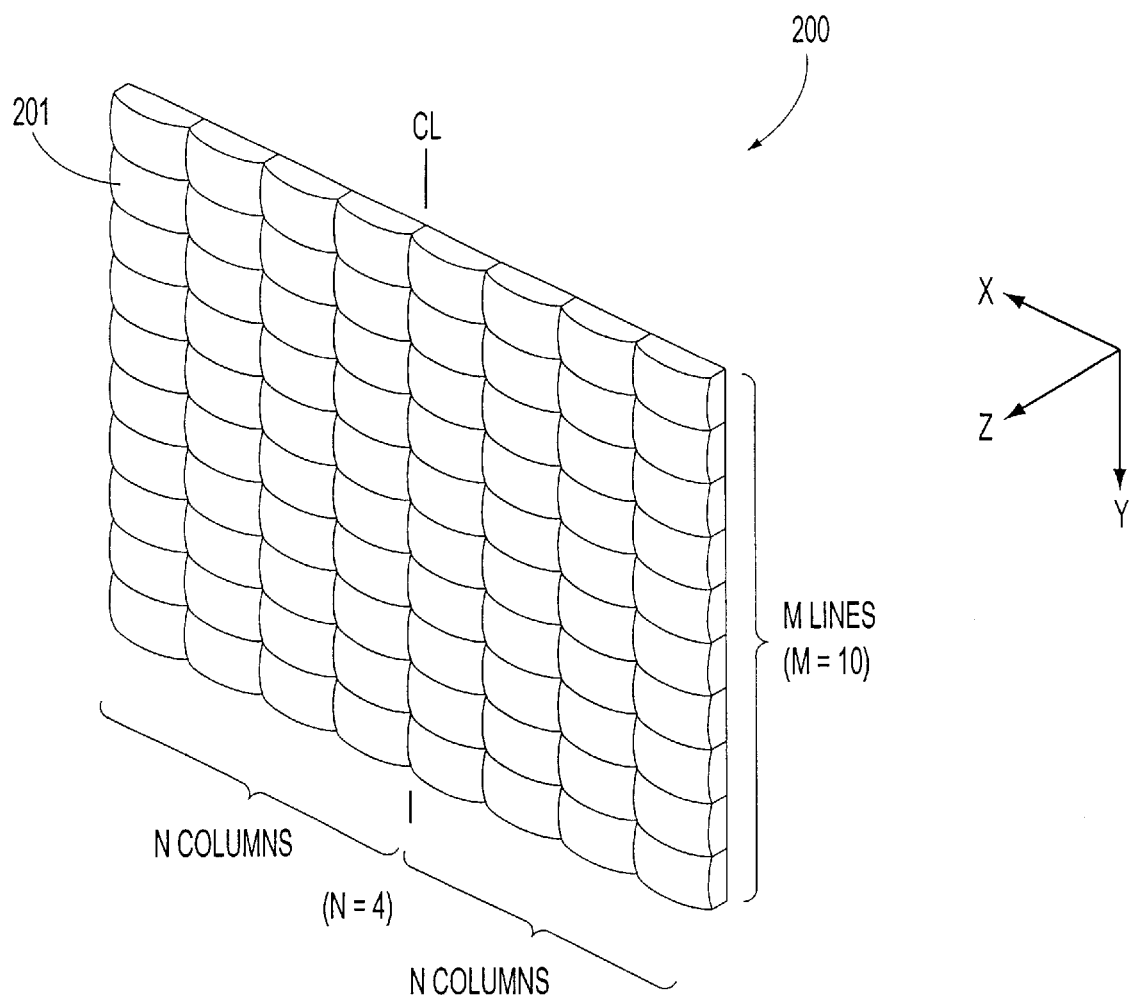
FIG. 11 is a perspective view of a first optical component 200.

The polarized light generation apparatus 70 includes a first optical component 200 and a second optical component 400. FIG. 11 is a perspective view of the first optical component 200. The first optical component 200 includes small rectangular light dividing lenses 201 arranged in a matrix having M lines in the longitudinal direction and 2-by-N columns in the transverse direction. Therefore, there are N columns on the left and N columns on the right of a center line CL in the transverse direction. In this example, M=10 and N=4. The first optical component 200 is placed such that an optical axis corresponds to the center of the first optical component 200. The external shape of each light dividing lens 201 viewed from the Z direction is set to be a figure that is similar to the shape of the illumination area 80 (liquid crystal light valves 803, 805, and 811 shown in FIG. 9). In this example, since the illumination area 80 is rectangular with longer sides in the X direction, the external shape of each light dividing lens 201 in the X–Y plane is also rectangular.

The second optical component 400 (shown in FIG. 10) includes an optical element 300 and an emitting side lens 390. The optical element 300 and the emitting side lens 390 are placed so that their centers correspond to the optical axis.

The optical element 300 includes a collective lens array 310, a shading plate 315, and two polarizing conversion elements 320a and 320b. The collective lens array 310 has the same structure as that of the first optical component 200, and is placed in the opposite direction to the first optical component 200. The collective lens array 310 along with the first optical component 200 collects a plurality of split beams that have been split by the individual light dividing lenses 201 and guides them into effective incident regions of the polarizing conversion elements 320a and 320b. The polarizing conversion elements 320a and 320b include two polarizing conversion elements as shown in FIGS. 1(A)–(B), in which polarization separating films and reflecting films of each polarizing conversion element are placed so as to be opposite to each other. As described above, in the polarizing conversion elements 320a and 320b, λ/2 phase plates 381 are selectively placed on the emitting planes of the polarizing beam splitters 330a and 330b. The shading plate 315 is placed in order to prevent light, which the collective lens array 310 has failed to collect into the polarization separating films of the polarizing conversion elements 320a and 320b, from directly entering into reflecting films. The polarizing conversion elements 320a and 320b are provided with polarization separating films and reflecting films in accordance with the present invention as described above. Therefore, a beam radiating from the light source 60 can be highly efficiently converted into one type of linear polarized light (s-polarized light in this example) for radiation.

The emitting side lens 390 shown in FIG. 10 superimposes a plurality of split beams radiating from the optical element 300 (split beams of linear polarized light converted by the polarizing conversion elements 320a and 320b) onto the illumination area 80, that is, the individual liquid crystal light valves 803, 805, and 811.

The dichroic mirrors 801 and 804 shown in FIG. 9 function as a color separating device for separating a beam radiating from the polarized light illumination apparatus 50 into three colors, i.e., red, blue, and green. The three liquid crystal light valves 803, 805, and 811 function as a modulating device for modulating the three colors individually to form an image in response to given image information (picture signals). The cross-dichroic prism 813 functions as a color synthesizing device for forming a color image by synthesizing the three colors. The projection lens 814 functions as a projection optical device for projecting light representing the synthesized color image onto a screen 815.

The dichroic mirror 801 for reflecting blue and green light transmits a red light component of the beam radiating from the polarized light illumination apparatus 50, and reflects a blue light component and a green light component. The transmitted red light is reflected by the reflecting mirror 802 to reach the liquid crystal light valve 803 for red light. Out of the blue light and green light reflected by the first dichroic mirror 801, the green light is reflected by the dichroic mirror 804 for reflecting green light to reach the liquid crystal light valve 805 for green light. While, the blue light passes through the second dichroic mirror 804 as well.

In this example, the blue light has the longest optical path among the three color lights. Thus, a light guide unit 850, which includes an incident side lens 806, a middle lens 808, and an emitting side lens 810, is placed for the blue light that has passed through the dichroic mirror 804. The blue light transmitted from the dichroic mirror 804 for reflecting green light is guided into the middle lens 808 through the incident side lens 806 and the reflecting mirror 807, and further is reflected by the reflecting mirror 809 and is guided into the emitting side lens 810 to reach the liquid crystal light valve 811 for blue light.

The three liquid crystal light valves 803, 805, and 811 modulate individual color beams in response to picture signals (image information) transmitted from an external control circuit (not shown in the drawing) and generate color beams containing image information of the individual color components. Each liquid crystal light valve is generally provided with polarizing plates (not shown in the drawing), one on the incident side and the other on the emitting side. Therefore, only given polarized light (s-polarized light in this example) passes through the polarizing plate on the incident side of each liquid crystal valve and is modulated.

The modulated three color beams enter into the cross-dichroic prism 813. The cross dichroic prism 813 includes a dielectric multilayered film for reflecting red light and a dielectric multilayered film for reflecting blue light, which are provided to form a cross-shape. The three color beams are synthesized by these dielectric multilayered films, and light representing a color image is formed. The synthesized light is projected onto the screen 815 by the projection lens 814 that is a projection optical system, and the enlarged image is displayed.

Since polarizing conversion elements 320a and 320b in accordance with the present invention are used in the polarized light illumination apparatus 50 of this projection display apparatus 800, the light emitted from the light source 60, which enters into the polarized light illumination apparatus 50, is emitted after being converted into desired linear polarized light (s-polarized light in this example) with high efficiency. Accordingly, the projection display apparatus provided with such polarizing conversion elements 320a and 320b enables the projected image on the screen 815 to have high luminance.

The present invention is not limited to the examples or the embodiments described above, and within a scope not deviating from the object of this invention, various alterations can be made. For example, the following alterations may be made.

(1) Although the dielectric multilayered film in accordance with the present invention is used both as the polarization separating film 20 and as the reflecting film 30 in this example, the dielectric multilayered film may be used as either one only of the above films. That is, the polarization separating film 20 alone may be the dielectric multilayered film in accordance with the present invention, or the reflecting film 30 alone may be the dielectric multilayered film in accordance with the present invention.

(2) Although the polarization separating film 20 is provided on the polarizing beam splitter 330 and used together with the reflecting film 30 in this example, the polarization separating film 20 may be used independently as a polarizing beam splitter for splitting s-polarized light from p-polarized light. That is, if a polarization separating film in accordance with the present invention is formed on a light transmissive substrate, a polarizing beam splitter having a good polarization separating property can be obtained.

(3) Although the reflecting film 30 is provided on the polarizing beam splitter 330 and is used together with the polarization separating film 20, the reflecting film 30 may be used independently as a mirror for s-polarized light. That is, if a reflecting film in accordance with the present invention is formed on a light transmissive substrate, a mirror having a good reflection property can be obtained.

(4) The polarized light illumination apparatus in accordance with the present invention may be applied to various devices in addition to the projection display apparatus shown in FIG. 9. For example, a polarized light illumination apparatus in accordance with the present invention may be applicable to a projection display apparatus that projects black-and-white images instead of color images. In such a case, one liquid crystal light valve suffices in the device shown in FIG. 9. Also, a color separating device for separating a beam into three colors and a color synthesizing device for synthesizing three color beams can be omitted. Further, the present invention may be applicable to a projection color display device using only one light valve, and also, applicable to a projection display apparatus which uses a reflective light valve or an image display device such as a rear-type display device which uses polarized illumination light.

What is claimed is:

1. A polarizing beam splitter that splits incident light into a first type and a second type of polarized light, the polarizing beam splitter comprising:

a light transmissive substrate having a refractive index ranging from approximately 1.48 to 1.58; and a polarization separating film formed on said light transmissive substrate, said polarization separating film comprising a multilayered structural section that includes $MgF_2$ layers and MgO layers alternately arranged.

2. The polarizing beam splitter according to claim 1, said polarization separating film further comprising a coating layer composed of $SiO_2$ formed on said multilayered structural section.

3. A polarizing beam splitter that splits incident light into a first type and a second type of polarized light, the polarizing beam splitter comprising:

a light transmissive substrate having a refractive index ranging from approximately 1.48 to 1.58; and a polarization separating film formed on said light transmissive substrate, said polarization separating film comprising a multilayered structural section that includes a plurality of layers, and a coating layer composed of $SiO_2$ formed on said multilayered structural section.

4. A polarizing conversion element that converts incident light into one type of polarized light, the polarizing conversion element comprising:

A) a polarizing beam splitter that splits incident light into a first type and a second type of polarized light; and B) a selective phase plate that converts the first type of polarized light into the second type of polarized light, said polarizing beam splitter comprising:

1) a plurality of light transmissive substrates placed along a given direction; and 2) a plurality of polarization separating films and a plurality of reflecting films alternately placed between said plurality of light transmissive substrates, said plurality of light transmissive substrates having a refractive index ranging from approximately 1.48 to 1.58, and each of said plurality of polarization separating films comprising a multilayered structural section that includes $MgF_2$ layers and MgO layers alternately arranged.

5. The polarizing conversion element according to claim 4, each of said plurality of polarization separating films further comprising a coating layer composed of $SiO_2$ formed on said multilayered structural section.

6. A polarizing conversion element that converts incident light into one type of polarized light, the polarizing conversion element comprising:

A) a polarizing beam splitter that splits incident light into a first type and a second type of polarized light; and B) a selective phase plate that converts the first type of polarized light into the second type of polarized light, said polarizing beam splitter comprising:

1) a plurality of light transmissive substrates placed along a given direction; and 2) a plurality of polarization separating films and a plurality of reflecting films alternately placed between said plurality of light transmissive substrates, said plurality of light transmissive substrates having a refractive index ranging from approximately 1.48 to 1.58, and each of said plurality of polarization separating films comprising:

i) a multilayered structural section that includes a plurality of layers; and ii) a coating layer composed of $SiO_2$ formed on said multilayered structural section.

7. The polarizing conversion element according to claim 4, each of said plurality of reflecting films having a same structure as that of each of said plurality of polarization separating films.

8. The polarizing conversion element according to claim 6, each of said plurality of reflecting films having a same structure as that of each of said plurality of polarization separating films.

9. The polarizing conversion element according to claim 4, each of said plurality of reflecting films comprising a multilayered structural section that includes a first layer having a lower refractive index and a second layer having a higher refractive index in comparison with a refractive index of said plurality of light transmissive substrates, said first layer and said second layer being alternately arranged; and said first layer being composed of $SiO_2$ and said second layer being composed of $Ta_2O_5$ or $TiO_2$.

10. The polarizing conversion element according to claim 6, each of said plurality of reflecting films comprising a multilayered structural section that includes a first layer having a lower refractive index and a second layer having a higher refractive index in comparison with a refractive index of said plurality of light transmissive substrates, said first layer and said second layer being alternately arranged; and said first layer being composed of $SiO_2$ and said second layer being composed of $Ta_2O_5$ or $TiO_2$.

11. The polarizing conversion element according to claim 9, said second layer comprising a $TiO_2$ layer formed by placing evaporated $TiO_2$ in a plasma atmosphere.

12. The polarizing conversion element according to claim 10, said second layer comprising a $TiO_2$ layer formed by laying evaporated $TiO_2$ in a plasma atmosphere.

13. A projector that displays images by projecting light, the projector comprising:

A) a polarized light illumination apparatus that generates substantially one type of polarized light;

B) a modulation device that modulates light emitted from said polarized light illumination apparatus in response to given picture signals; and C) a projection optical device that projects the light modulated by said modulation device, said polarized light illumination apparatus comprising:
1) a light source; and
2) a polarizing conversion element that converts the light emitted from said light source into substantially one type of polarized light, said polarizing conversion element comprising:
i) a polarizing beam splitter that splits incident light into a first type and a second type of polarized light; and
ii) a selective phase plate that converts the first type of polarized light into the second type of polarized light, said polarizing beam splitter comprising:
a) a plurality of light transmissive substrates placed along a given direction; and
b) a plurality of polarization separating films and a plurality of reflecting films alternately placed between said plurality of light transmissive substrates, said plurality of light transmissive substrates having a refractive index ranging from approximately 1.48 to 1.58, and each of said plurality of polarization separating films comprising a multilayered structural section that includes MgF2 layers and MgO layers alternately arranged.

14. The projector according to claim 13, each of said plurality of polarization separating films further comprising a coating layer composed of SiO2 formed on said multilayered structural section.

15. A projector that displays images by projecting light, the projector comprising:

A) a polarized light illumination apparatus that generates substantially one type of polarized light;

B) a modulation device that modulates light emitted from said polarized light illumination apparatus in response to given picture signals; and C) a projection optical device that projects the light modulated by said modulation device, said polarized light illumination apparatus comprising:
1) a light source; and
2) a polarizing conversion element that converts the light emitted from said light source into substantially one type of polarized light, said polarizing conversion element comprising:
i) a polarizing beam splitter that splits incident light into a first type and a second type of polarized light; and
ii) a selective phase plate that converts the first type of polarized light into the second type of polarized light, said polarizing beam splitter comprising:
a) a plurality of light transmissive substrates placed along a given direction; and
b) a plurality of polarization separating films and a plurality of reflecting films alternately placed between said plurality of light transmissive substrates, each of said plurality of light transmissive substrates having a refractive index ranging from approximately 1.48 to 1.58, and each of said plurality of polarization separating films comprising a multilayered structural section that includes a plurality of layers and a coating layer composed of SiO2 formed on said multilayered structural section.

16. The projector according to claim 13, each of said plurality of reflecting films having a same structure as that of each of said plurality of polarization separating films.

17. The projector according to claim 15, each of said plurality of reflecting films having a same structure as that of each of said plurality of polarization separating films.

18. The projector according to claim 13, each of said plurality of reflecting films comprising a first layer having a lower refractive index and a second layer having a higher refractive index in comparison with a refractive index of said plurality of light transmissive substrates, said first layer and said second layer being alternately arranged; and said first layer being composed of SiO2 and said second layer being composed of Ta2O5 or TiO2.

19. The projector according to claim 15, each of said plurality of reflecting films comprising a first layer having a lower refractive index and a second layer having a higher refractive index in comparison with a refractive index of said plurality of light transmissive substrates, said first layer and said second layer being alternately arranged; and said first layer being composed of SiO2 and said second layer being composed of Ta2O5 or TiO2.

20. The projector according to claim 18, said second layer comprising a TiO2 layer formed by placing evaporated TiO2 in a plasma atmosphere.

21. The projector according to claim 19, said second layer comprising a TiO2 layer formed by placing evaporated TiO2 in a plasma atmosphere.

* * * * *